(12) United States Patent
Kamm et al.

(10) Patent No.: US 7,582,040 B2
(45) Date of Patent: Sep. 1, 2009

(54) MULTI-SPEED GEARBOX

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Konstanz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 410 days.

(21) Appl. No.: 11/716,754

(22) Filed: Mar. 12, 2007

(65) Prior Publication Data

US 2007/0225108 A1    Sep. 27, 2007

(30) Foreign Application Priority Data

Mar. 23, 2006  (DE)  ................. 10 2006 013 371

(51) Int. Cl.
    *F16H 3/44*  (2006.01)
(52) U.S. Cl. .............. 475/282; 475/275; 475/277; 475/288; 475/330
(58) Field of Classification Search ............ 475/275, 475/276, 277, 282, 288, 330
    See application file for complete search history.

(56) References Cited

U.S. PATENT DOCUMENTS

| | | |
|---|---|---|
| 6,176,803 B1 | 1/2001 | Meyer et al. |
| 6,634,980 B1 | 10/2003 | Ziemer |
| 6,960,149 B2 | 11/2005 | Ziemer |
| 7,014,589 B2 | 3/2006 | Stevenson |
| 7,018,319 B2 | 3/2006 | Ziemer |
| 2008/0171629 A1* | 7/2008 | Hart et al. ............ 475/276 |
| 2008/0182705 A1* | 7/2008 | Hart et al. ............ 475/269 |
| 2008/0207381 A1* | 8/2008 | Wittkopp et al. .......... 475/276 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 10 2004 029 952 A1 | 1/2005 |
| DE | 10 2005 002 337 A1 | 8/2006 |
| DE | 10 2005 010 210 A1 | 9/2006 |

* cited by examiner

*Primary Examiner*—David D. Le
(74) *Attorney, Agent, or Firm*—Davis & Bujold, P.L.L.C.

(57) ABSTRACT

An eight-gear gearbox comprises an input shaft, an output shaft, four planetary gear sets, eight rotatable shafts and five shifting elements.

33 Claims, 2 Drawing Sheets

Fig. 1

| Gear | Engaged Shifting Elements | | | | | Ratio i | Step φ |
|---|---|---|---|---|---|---|---|
| | Brake | | Clutch | | | | |
| | A | B | C | D | E | | |
| 1 | ● | ● | ● | | | 4.70 | 1.48 |
| 2 | ● | ● | | | ● | 3.18 | 1.51 |
| 3 | | ● | ● | | ● | 2.10 | 1.28 |
| 4 | | ● | | ● | ● | 1.65 | 1.28 |
| 5 | | ● | ● | ● | | 1.29 | 1.29 |
| 6 | | | ● | ● | ● | 1.00 | 1.20 |
| 7 | ● | | ● | ● | | 0.84 | 1.23 |
| 8 | ● | | | ● | ● | 0.68 | TOTAL 6.94 |
| R | ● | ● | | ● | | -2.90 | |

Fig. 2

MULTI-SPEED GEARBOX

This application claims priority from German Application Serial No. 10 2006 013 371.4 filed Mar. 23, 2006.

FIELD OF THE INVENTION

The invention relates to a multi-speed gearbox in a planetary design, in particular an automatic gearbox for a motor vehicle, comprising one input shaft and one output shaft, four planetary gearsets, at least eight rotatable shafts, as well as five shifting elements, whose selective locking determines the different gear ratios between the input shaft and output shaft, so that eight forward gears and at least one reverse gear can be implemented.

BACKGROUND OF THE INVENTION

In the state of the art, automatic gearboxes, particularly for motor vehicles, comprise planetary gearsets that are switched by way of friction or shifting elements, such as clutches and brakes and are usually connected with a starting element that is subject to slip-effect and is optionally provided with a lock-up clutch, such as a hydrodynamic torque converter or a fluid clutch.

The Applicant's DE 101 15 983 A1, for example, discloses a multi-speed gearbox with an input shaft that is connected to a front-mounted gearset, with an output shaft that is connected to a rear-mounted gearset with a maximum of seven shifting elements, which can be selectively switched to produce at least seven forward gears without range shifting. The front-mounted gearset consists of a shiftable or non-shiftable planetary gearset, or a maximum of two non-shiftable, coupled planetary gearsets. The rear-mounted gearset is configured as a two-carrier, four-shaft gearbox with two shiftable planetary gearsets, and has four free shafts. The first free shaft of this two-carrier, four-shaft gearbox is connected to the first shifting element, the second free shaft with the second and third shifting elements, the third free shaft with the fourth and fifth shifting elements, and the fourth free shaft is connected to the output shaft. For a multi-speed gearbox with a total of six shifting elements, the invention proposes to additionally connect the third free shaft or the first free shaft of the rear-mounted gearbox with a sixth shifting element. For a multi-speed gearbox with a total of seven shifting elements, the invention proposes to additionally connect the third free shaft with a sixth shifting element, and to additionally connect the first free shaft with a seventh shifting element.

Several other multi-speed gearboxes are known, for example from the applicant's DE 101 15 995 A1, which discloses four shiftable, coupled planetary gearsets and six or seven friction-locking shifting elements, whose selective engagement transfers a revolution speed of an input shaft of the gearbox to an output shaft of the gearbox in such a way that nine or eleven forward gears and at least one reverse gear can be implemented. Depending on the gear arrangement, in each gear two or three shifting elements are engaged, and when switching from one gear into the next higher gear or the next lower gear, only one engaged shifting element is disengaged, and one shifting element, which was previously disengaged, is engaged, in order to avoid range shifting.

In addition, the applicant's non-published generic patent application DE 10 2005 002 337.1 discloses a multi-speed gearbox with an input shaft, an output shaft, four coupled single planetary gearsets and five shifting elements, by way of which eight forward gears can be shifted without range shifting in such a way that when switching from one forward gear into the respective next following higher or lower forward gear, only one of the previously engaged shifting elements is disengaged, and only one of the previously disengaged switching elements is engaged. The multi-speed gearbox also has a reverse gear. In each of the forward gears, and in the reverse gear, three shifting elements are engaged. With respect to the kinematic coupling of the four planetary gearsets with each other and with the input and output shafts, a carrier of the fourth planetary gearset and the input shaft are connected, forming a first shaft of the gearbox; a carrier of the third planetary gearset and the output shaft are connected, forming a second shaft of the gearbox; a sun gear of the first planetary gearset and a sun gear of the fourth planetary gearset are connected, forming a third shaft of the gearbox; a ring gear of the first planetary gearset forms a fourth shaft of the gearbox; a ring gear of the second planetary gearset and a sun gear of the third planetary gearset are connected, forming a fifth shaft of the gearbox; a carrier of the first planetary gearset and a ring gear of the third planetary gearset are connected, forming a sixth shaft of the gearbox; a sun gear of the second planetary gearset and a ring gear of the fourth planetary gearset are connected, forming a seventh shaft of the gearbox; and a carrier of the second planetary gearset forms an eighth shaft of the gearbox. With respect to the kinematic coupling of the five shifting elements to the four planetary gearsets, and to the input and output shaft, the first shifting element is arranged in the power flow between the third shaft and a housing of the gearbox, the second shifting element between the fourth shaft and the housing of the gearbox, the third shifting element between the first and fifth shaft, the fourth shifting element either between the eighth and second shafts or between the eighth and sixth shafts, and the fifth shifting element either between the seventh and fifth shafts or between the seventh and eighth shafts, or between the fifth and eighth shafts.

As a general concept, automatically shiftable motor vehicle gearboxes in planetary design have been described many times before in the state of the art and are subject to constant further development and improvement. Gearboxes of this kind should therefore disclose a sufficient number of forward gears and one reverse gear, and a high transmission-ratio spread and favorable progressive ratio that are suited to motor vehicles. In addition, they should enable a high starting-torque ratio in a forward direction and include a direct gear for use in both passenger cars and commercial vehicles. In addition, these gearboxes should also be easy to install and should require, in particular, a small number of shifting elements, and they should avoid double shifting during sequential shifting, so that when shifting into defined shifting groups, only one shifting element is changed at any given time.

The present invention is based on the task of proposing a multi-speed gearbox of the initially described art, with at least eight forward gears that can be shifted without range-shifting and at least one reverse gear, which, with the use of at least four planetary gearsets, requires a minimum number of shifting elements. In addition, the gearbox should have a high transmission-ratio spread with relatively harmonic gear shifting and, at least in the main driving gears, should demonstrate a favorable degree of efficiency, i.e., relatively low towing and toothing losses.

SUMMARY OF THE INVENTION

The multi-speed gearbox in planetary design of the invention is based on the gear scheme of the applicant's patent application of the generic type DE 10 2005 002 337.1 and discloses an input shaft, an output shaft, four coupled planetary gearsets, at least eight rotatable shafts, and five shifting elements (two brakes and three clutches), whose selective engagement produces different transmission ratios between the input shaft and the output shaft, so that eight forward gears and one reverse gear are obtained. In each gear respectively, three of the five shifting elements are locked, whereby when shifting from one forward gear into the respective next following higher or lower forward gear, only one of the previously engaged shifting elements is disengaged, and only one of the previously disengaged shifting elements is engaged.

In terms of the invention, it is proposed that
 a ring gear of the second planetary gearset and the input shaft be permanently connected, forming the first shaft of the gearbox;
 a carrier of the third planetary gearset and the output shaft be permanently connected, forming the second shaft of the gearbox;
 a sun gear of the first planetary gear set and a sun gear of the fourth planetary gearset be permanently connected, forming the third shaft of the gearbox;
 a ring gear of the first planetary gearset forming the fourth shaft of the gearbox;
 a sun gear of the third planetary gearset and a carrier of the fourth planetary gearset be permanently connected, forming the fifth shaft of the gearbox;
 a carrier of the first planetary gearset and a ring gear of the third planetary gearset be permanently connected, forming the sixth shaft of the gearbox;
 a sun gear of the second planetary gearset and a ring gear of the fourth planetary gearset be permanently connected, forming the seventh shaft of the gearbox;
 a carrier of the second planetary gearset forming the eight shaft of the gearbox;
 the first shifting element be arranged in the power flow between the third shaft and a housing of the gearbox;
 the second shifting element be arranged in the power flow between the fourth shaft and the housing of the gearbox;
 the third shifting element be arranged in the power flow between the first and the fifth shaft of the gearbox;
 the fourth shifting element be arranged in the power flow between the second and eighth shaft of the gearbox, and
 the fifth shifting element be arranged in the power flow between the fifth and the eighth shaft of the gearbox.

The multi-speed gearbox of the present invention is different from the generic multi-speed gearbox according to DE 10 2005 002 337.1 in that henceforth, the ring gear of the second planetary gearset and the input shaft are permanently connected as the first shaft of the gearbox; the sun gear of the third planetary gearset and the carrier of the fourth planetary gearset are permanently connected as the fifth shaft of the gearbox; and the fifth shifting element in the power flow is henceforth arranged between the fifth and the eighth shaft.

As in the generic multi-speed gearbox according to DE 10 2005 002 337.1, it is also the case with the multi-speed gearbox of the invention that the first forward gear results from the engagement of the first, second, and third shifting elements; the second forward gear from the engagement of the first, second and fifth shifting elements; the third forward gear from the engagement of the second, third and fifth shifting elements; the fourth forward gear from the engagement of the second, fourth and fifth shifting elements; the fifth forward gear from the engagement of the second, third and fourth shifting elements; the sixth forward gear from the engagement of the third, fourth and fifth shifting elements; the seventh forward gear from the engagement of the first, third and fourth shifting elements; the eighth forward gear from the engagement of the first, fourth and fifth shifting elements, and the reverse gear from the engagement of the first, second and fourth shifting elements.

All four planetary gearsets are preferably configured as so-called negative planetary gearsets, whose respective planetary gears mesh with the sun gear and ring gear of the respective planetary gearset. With respect to the spatial arrangement of the four planetary gearsets in the gearbox housing, an advantageous configuration proposes that all four planetary gearsets be co-axially arranged, parallel to each other, in the sequential order of "first, fourth, second and third planetary gearset".

The spatial arrangement within the gearbox housing of the shifting elements in the multi-speed gearbox of this invention is limited, in principle, only by the measurements and the external form of the gearbox housing. Numerous alternatives concerning the spatial arrangement and constructive design of the shifting elements can be seen, for example, in the patent application of the same genre, DE 10 2005 002 337.1.

For example, in an option for the arrangement of shifting elements suitable for a standard drive, it is suggested that
 in a spatial sense, the first and second shifting elements be radially arranged, at least in part, above the first or fourth planetary gearset; in which case the first and second shifting elements, in a spatial sense, can be arranged, at least in part, axially in parallel, or at least in part radially, one above the other,
 the third shifting element be arranged, in spatial terms, at least in part, in an area axially between the fourth and second planetary gearsets, in particular axially immediately adjacent to the fourth planetary gearset;
 the fourth shifting element be arranged, in spatial terms, at least partially on the side of the third planetary gearset, which faces away from the second planetary gearset, and
 the fifth shifting element be arranged, in spatial terms, essentially in an area that is axially between the second and third planetary gearset.

Regarding the spatial disposition of the fourth and fifth shifting elements inside the gearbox housing, the following advantageous variants should be pointed out specially: In another configuration of the gearbox, for example, the fourth shifting element can be arranged, in spatial terms, at least partially in an area axially between the second and third planetary gearset, in particular adjacent to the fifth shifting element, whereupon in this case, only one section of the eighth shaft of the gearbox passes through the center of the second planetary gearset in an axial direction, and only one section of the second shaft of the gearbox through the center of the third planetary gearset in an axial direction. Advantageously, with this configuration of the fourth and fifth shifting element, there can be a common disk support.

A further configuration of the gearbox is proposed, where the fourth and fifth shifting elements are arranged, in spatial terms, essentially in an area axially between the fourth and second planetary gearset. For example, the fifth shifting element can be arranged to be axially adjacent the second planetary gearset, and the fourth shifting element can be arranged, at least in part, on the side of the fifth shifting element that faces away from the second planetary gearset. However, both the fourth and fifth shifting elements can also be arranged to be axially adjacent the second planetary gearset, whereupon a friction element of the fourth shifting element is arranged on a larger diameter than a friction element of the fifth shifting element. In both cases, it can be advantageous to provide a common disk support for the fourth and fifth shifting elements, the support being permanently connected with the carrier of the second planetary gearset.

The configuration of the multi-speed gearbox according to the invention produces suitable transmissions for passenger cars with a high transmission-ratio spread in harmonic gear shifting. In addition, the expense of construction is relatively small with the multi-speed gearbox disclosed in the invention due to the small number of shifting elements, i.e., two brakes and three clutches. In addition, in the case of the multi-speed gearbox disclosed in the invention, there is a good degree of efficiency in all gears, on the one hand due to low towing loss, because in each gear there are only two gears that are not engaged at any time, and on the other hand due to lower toothing loss in the simply constructed individual planetary gearsets.

In addition, it is advantageously possible, with the multi-speed gearbox according to the invention, to start the vehicle with a hydrodynamic torque converter, an external starting clutch, or with other suitable external starting elements. It is also possible to enable starting by way of a starting element integrated into the gearbox. One of the two brakes that are actuated in the first and second forward gears and in the reverse gear is preferentially suited for this purpose.

Furthermore, the multi-speed gearbox according to the invention is conceived to enable adaptability to different power-train configurations, in both the direction of the power flow and with respect to spatial considerations. For example, it is therefore possible, without special constructive measures, to selectively arrange the input and output of the gearbox co-axially or axially parallel to each other.

In the case of an application with co-axially running input and output shafts it is practical, for example, that the first planetary gearset be the planetary gearset of the planetary gearset group of the invention that faces the power train. Depending on the spatial arrangement of the five shifting elements inside the gearbox housing, there can be provision for no more than one shaft of the gearbox to pass centrally, in an axial direction, through all four planetary gearsets, whereby, for example, the first shaft of the gearbox only passes centrally, in an axial direction, through the first and fourth planetary gearsets, while the eighth shaft of the gearbox passes centrally, in an axial direction, only through the second and third planetary gearsets.

For an application where the input and output shafts run axially parallel or at an angle to each other, the first or third planetary gearset can be arranged on the side of the gearbox housing that faces the drive motor that is functionally connected with the input shaft. If the first planetary gearset faces the gearbox drive, there can be provision for no more than one shaft of the gearbox to pass centrally in an axial direction through all four planetary gearsets, depending on the spatial arrangement of the five shifting elements inside the gearbox housing—as with the co-axial arrangement of the input and output shafts: the first shaft of the gearbox passing centrally only through the first and fourth planetary gearsets; the eighth shaft of the gearbox passing through only the second and third planetary gearset.

On the other hand, if the third planetary gearset faces the gearbox drive, in connection with input and output shafts that are not co-axially arranged, no gearbox shaft will pass centrally, in an axial direction, through the first and/or fourth planetary gearset. Depending on the spatial arrangement of the shifting elements relative to the planetary gearsets, the eighth shaft of the gearbox as well as the second shaft of the gearbox can, for example, pass centrally in an axial direction through the second and third planetary gearsets, whereby the second shaft runs in sections centrally within the eighth shaft. In another configuration, however, it can be provided that only the eighth shaft passes centrally through the second planetary gearset, and the second shaft passes centrally in an axial direction only through the third planetary gearset. In yet another configuration, the fifth shaft, for example, and the second shaft pass centrally, in an axial direction through the second planetary gearset, whereby the second shaft passes centrally, in an axial direction, only through the third planetary gearset, and the second shaft runs centrally, in sections, inside the fifth shaft.

In any case, the third shaft of the gearbox, which is formed in sections by the sun gears of the first and fourth planetary gearset, can be rotatably disposed on a hub attached to the gearbox housing. If the first planetary gearset faces the gearbox drive, the hub, which is fixed to the gearbox housing, is an integral part of the drive-side wall of the gearbox housing, otherwise it is an integral part of the gearbox wall opposite from the drive motor.

BRIEF DESCRIPTION OF THE DRAWINGS

The invention will now be described, by way of example, with reference to the accompanying drawings. The same, or as the case may be comparable components are provided with the same reference signs. The following are shown.

DETAILED DESCRIPTION OF THE INVENTION

Figure 1:
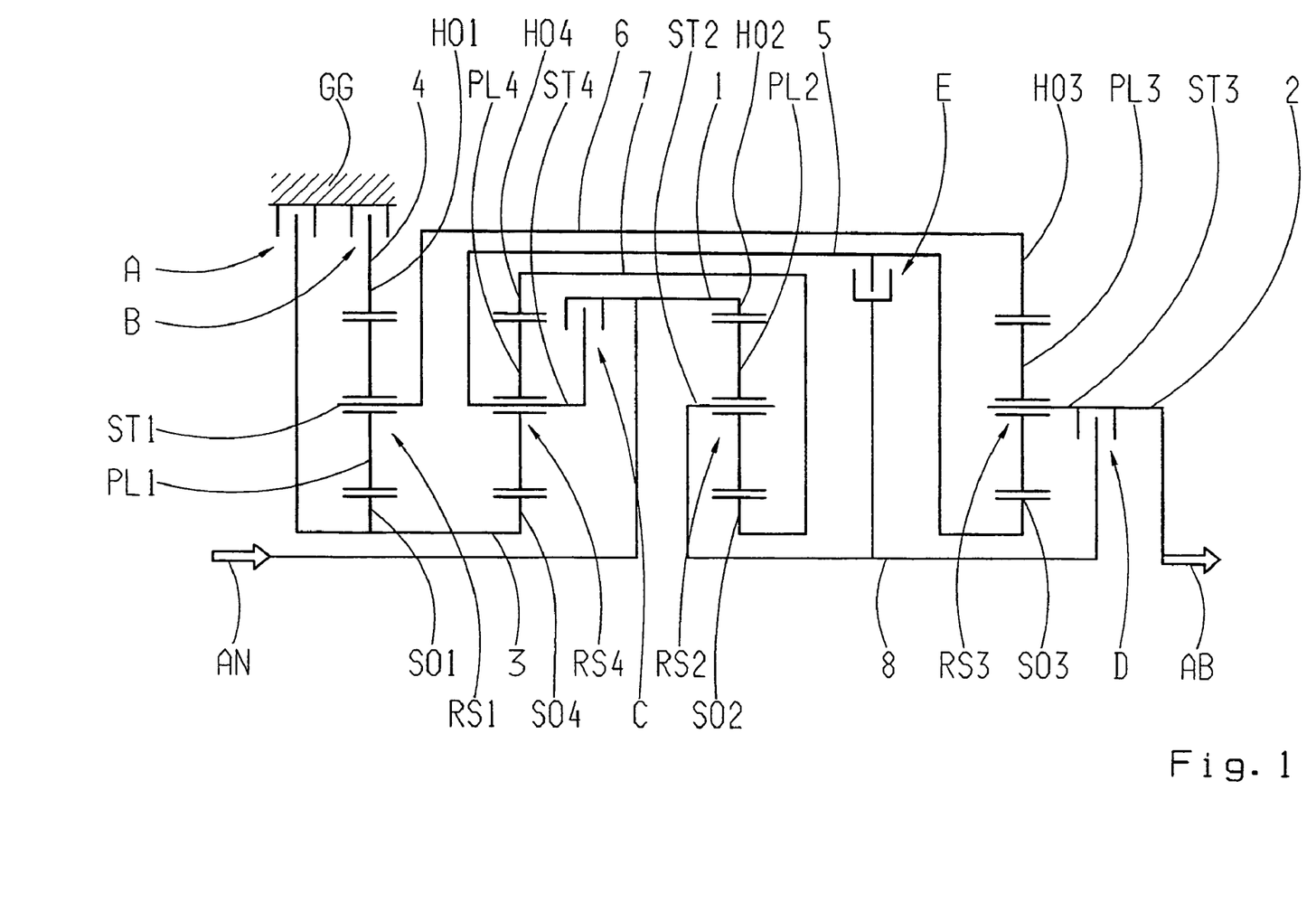
FIG. 1 is a schematic presentation of a version of a multi-speed gearbox according to the invention.

FIG. 1 shows a schematic presentation of a version of a multi-speed gearbox according to the invention. The gearbox comprises an input shaft AN and an output shaft AB, as well as four planetary gearsets RS1, RS2, RS3, RS4 and five shifting elements A, B, C, D, E, which are all arranged in a housing GG of the gearbox. All four planetary gearsets RS1, RS2, RS3, RS4, are configured as simple negative planetary gearsets, and in this version are arranged co-axially in series in an axial direction in the order "RS1, RS4, RS2, RS3." As is generally known, a negative planetary gearset has planetary gears that mesh with sun and ring gears of this planetary set. The ring gears of the four planetary gearsets RS1, RS2, RS3, RS4 are designated with HO1, HO2, HO3, and HO4; the sun gears with SO1, SO2, SO3, and SO4; the planetary gears with PL1, PL2, PL3 and PL4; and the carriers on which the planetary gears are rotatably disposed with ST1, ST2, ST3, and ST4. The shifting elements A and B are configured as brakes, which in the version shown are both configured as friction-locking disc brakes, and of course in a different embodiment also as friction-locking, shiftable peripheral band brakes or, for example, as form-locking, shiftable claw or cone brakes. The shifting elements C, D and E are configured as clutches, which in the version shown as an example, are all configured as friction-locking disk clutches, and which in another embodiment, could, for example, be configured as form-locking, shiftable claw or cone clutches. With these five shifting elements A to E, selective shifting of eight forward gears and at least one reverse gear can be implemented. The multi-speed gearbox according to the invention has a total of at least eight rotatable shafts, which are designated as 1 to 8.

With regard to the kinematic coupling of the individual elements of the four planetary gearsets RS1, RS2, RS3, RS4 to each other and to the input and output shafts AN, AB, the following is provided: The ring gear HO2 of the second planetary gearset RS2 and the input shaft AN are permanently connected and form the first shaft 1 of the gearbox. The carrier ST3 of the third planetary gearset RS3 and the output shaft AB are permanently connected and form the second shaft 2 of the gearbox. The sun gear SO1 of the first planetary gearset RS1 and the sun gear SO4 of the fourth planetary gearset RS4 are permanently connected and form the third shaft 3 of the gearbox. The ring gear HO1 of the first planetary gearset RS1 forms the fourth shaft 4 of the gearbox. The sun gear SO3 of the third planetary gearset RS3 and the carrier ST4 of the fourth planetary gearset RS4 are permanently connected and form the fifth shaft 5 of the gearbox. The carrier ST1 of the first planetary gearset RS1 and the ring gear HO3 of the third planetary gearset RS3 are permanently connected and form the sixth shaft 6 of the gearbox. The sun gear SO2 of the second planetary gearset RS2 and the ring gear HO4 of the fourth planetary gearset RS4 are permanently connected and form the seventh shaft 7 of the gearbox. The carrier ST2 of the second planetary gearset RS2 forms the eighth shaft 8 of the gearbox.

With regard to the kinematic coupling of the five shifting elements A to E with the so described shafts 1 to 8 of the gearbox, the following is provided for in the multi-speed gearbox according to FIG. 1: the brake A as the first shifting element is arranged in the power flow between the shaft 3 and a housing GG of the gearbox. The brake B as the second shifting element is arranged in the power flow between the shaft 4 and the housing GG. The clutch C as the third shifting element is arranged in the power flow between the shaft 1 and the shaft 5. The clutch D as the fourth shifting element is arranged in the power flow between the shaft 2 and the shaft 8. The clutch E as the fifth shifting element is arranged in the power flow between the shaft 5 and the shaft 8.

In the version of the invention shown in FIG. 1, the first planetary gearset RS1 is the input-side gearset of the gearbox, and the third planetary gearset RS3 is the output-side gearset of the gearbox, whereby the input shaft AN and the output shaft AB, for example, are arranged co-axially to each other. It is easily apparent to the person skilled in the art that this gearbox can be modified without major effort, so that input and output shafts are no longer co-axially arranged, but rather, for example, axially parallel or at an angle to each other. With this type of arrangement, the person skilled in the art will arrange the gearbox drive near the third planetary gearset RS3, that is, on the side of the third planetary gearset RS3 that faces away from the first planetary gearset RS1.

In principle, the spatial arrangement of the shifting elements inside the gearbox of the multi-speed gearbox according to the invention as shown in FIG. 1 is discretionary and will be limited only by the measurements and external form of the gearbox housing GG.

In the version shown in FIG. 1, the two brakes A, B are arranged in spatial terms in the area of the first planetary gearset RS1, which in this case is axially parallel, on the input side, whereby the kinematic connection of the two brakes A, B to the first planetary gearsets RS1 presupposes that the brake B be arranged nearer to the fourth planetary gearset RS4, which is adjacent to the first planetary gearset RS1, than it is to brake A, or as the case may be, that brake A be arranged closer to the drive of the gearbox than brake B. In spatial terms, brake B is arranged at least in part in an area radially above the first planetary gearset RS1, and brake A, correspondingly, is on the side of the first planetary gearset RS1 that faces away (input side) from the fourth planetary gearset RS4. An inner disk carrier of brake A forms a section of the shaft 3 of the gearbox and is connected in a rotationally fixed manner to the sun gear SO1 of the first planetary gearset RS1 on the side of the gearset that faces away from the fourth planetary gearset RS4. In sections, the shaft 3 is formed as a kind of sun shaft, which connects the sun gears SO1, SO4 of the planetary gearsets RS1, RS4. In this case, the shaft 3 and the input shaft AN can be adjustably disposed on both the input shaft AN and a hub (not shown in detail in FIG. 1) that is fixed to the gearbox housing. An inner disk carrier of the brake B, as the shaft 4 of the gearbox, is connected in a rotationally fixed manner with the ring gear HO1 of the first planetary gearset RS1. For purposes of simplification, the servo mechanisms necessary to actuate the friction elements of both brakes A, B are not depicted in detail and could, for example, be integrated into the gearbox housing GG or a housing cover that is fixed to the housing, or as the case may be, disposed in an axially slidable manner.

The person skilled in the art will of course modify the exemplary spatial arrangement of the two brakes A, B as required. The brake A could, for example, be arranged at least in part radially above the first planetary gearset RS1, and the brake B at least in part radially above the fourth planetary gearset RS4. In yet another embodiment, the two brakes A, B could, for example, also be arranged radially, one above the other, axially adjacent to the first planetary gearset RS1, on the side of this gearset that faces away from the fourth planetary gearset RS4, whereby brake B is then, for example, arranged on a larger diameter than brake A.

As can also be seen from FIG. 1, the clutch C—at least a friction element of the clutch C configured as a disk pack—is, in spatial terms, axially arranged in an area between the fourth and second planetary gearsets RS4, RS2, thereby axially adjacent on the fourth planetary gearset RS4. An inner disk carrier of the clutch C is thereby affixed in a rotationally fixed manner to the carrier ST4 of the fourth planetary gearset RS4 and forms a section of the shaft 5 of the gearbox, while an outer disk carrier of the clutch C forms a section of the shaft 1 of the gearbox and is connected in a rotationally fixed manner with the input shaft AN and the ring gear HO2 of the second planetary gearset RS2 on the side of the disk pack of clutch C that faces away from the fourth planetary gearset RS4. The shaft 7 of the gearbox, which connects the ring gear HO4 of the fourth planetary gearset RS4 with the sun gear SO2 of the second planetary gearset RS2, radially surrounds the clutch C. For the purpose of simplification, the servo mechanism necessary for actuating the disk pack of the clutch C is not shown in detail in FIG. 1 and can, for example, be arranged inside the cylinder chamber that is formed by the outer disk carrier of the clutch C and be disposed, correspondingly, in an axially slideable manner on this outer disk carrier of the clutch C. In order to compensate for the rotatory pressure of its rotating pressure chamber, the servomechanism of clutch C can, as is known from the prior art, be provided with dynamic pressure compensation.

As can also be seen from FIG. 1, the clutch D—at least a friction element of the clutch D that is configured as a disk pack—is, in spatial terms, arranged on the side of the third planetary gearset RS3 that faces away from the second planetary gearset RS2, axially adjacent directly on the third planetary gearset RS3. An inner disk carrier of the clutch D forms a section of the shaft 8 of the gearbox. An outer disk carrier of the clutch D forms a section of the shaft 2 of the gearbox and is connected in a rotationally fixed manner with the carrier ST3 of the third planetary gearset RS3 and with the output shaft AB. In its axial course, the shaft 8 therefore passes centrally through the second and third planetary gearset RS2, RS3. For the purpose of simplification, the servo mechanism necessary for actuating the disk pack of the clutch D is not shown in detail and can, for example, be arranged inside the cylinder chamber that is formed by the outer disk carrier of the clutch D and be disposed, correspondingly, in an axially slideable manner on this outer disk carrier of the clutch D. In order to compensate for the rotatory pressure of its rotating pressure chamber, the servomechanism of the clutch D can, as is known from the prior art, be provided with dynamic pressure compensation.

As can also be seen from FIG. 1, the clutch E—at least a friction element of the clutch E configured as a disk pack—is, in spatial terms, axially arranged in an area between the second and third planetary gearsets RS2, RS3. An inner disk carrier of the clutch E thereby forms a section of the shaft 8 of the gearbox and is connected in a rotationally fixed manner with both the carrier ST2 of the second planetary gearset RS2 and the inner disk carrier of the clutch D. An outer disk carrier of the clutch E forms a section of the shaft 5 of the gearbox and is connected in a rotationally manner with both the carrier ST4 of the fourth planetary gearset RS4 and the sun gear SO3 of the third planetary gearset. The shaft 5 thereby radially surrounds the shaft 7, and in its axial course completely overlaps with the second and fourth planetary gearsets RS2, RS4, as well as the clutch C. The shaft 6 of the gearbox, on the other hand, which connects the carrier ST1 of the first planetary gearset RS1 with the ring gear HO3 of the third planetary gearset RS3, radially surrounds the shaft 5. For the purpose of simplification, the servomechanism necessary for actuating the disk pack of the clutch E is not shown in detail in FIG. 1 and can, for example, be arranged in an axially slideable manner on the inner disk carrier of the clutch E. In order to compensate for the rotatory pressure of its rotating pressure chamber, the servomechanism of the clutch E can, as is known from the prior art, be provided with dynamic pressure compensation.

Deviating from FIG. 1, the person skilled in the art will modify the spatial arrangement of the clutch D or the spatial arrangement of the two clutches D and E as needed, in particular in order to obtain a preassembled group of components with a common disk carrier for both clutches D, E. Then, for example, the clutch D can also be arranged, in spatial terms, in an area axially between the second planetary gearset RS2 and the third planetary gearset RS3, preferably adjacent to the fifth shifting element E. In this case, only a section of the shaft 8 passes centrally in an axial direction through the second planetary gearset RS2, and only a section of the shaft 2 through the third planetary gearset RS3. But in another configuration, it can also be arranged, for example, for the two clutches D and E to be arranged in spatial terms essentially in an area located axially between the fourth planetary gearset RS4 and the second planetary gearset RS2. It can thereby be provided, for example, that the clutch E is arranged as axially adjacent to the second planetary gearset RS2, and for clutch D to be arranged at least in part on the side of the clutch E that faces away from the second planetary gearset RS2. However, it can also be provided that the two clutches D, E are axially adjacent on the second planetary gearset RS2, whereby the friction element or, as the case may be, the disk pack of the clutch D is then arranged on a larger diameter than the friction element or, as the case may be, the disk pack of the clutch E. In both of the cited cases, it can advantageously be provided for the clutches D, E to have a common disk carrier, which is directly connected with the carrier ST2 of the second planetary gearset RS2.

Figure 2:
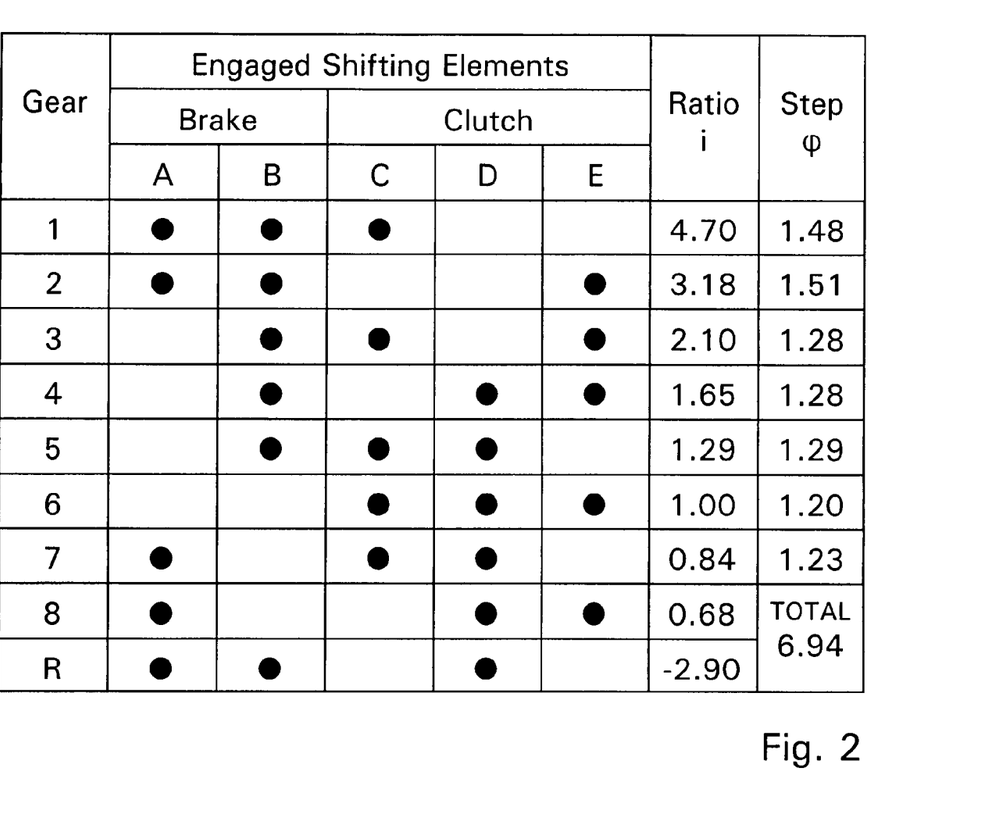
FIG. 2 is an example of a shift pattern for the multi-speed gearbox according to FIG. 1.

FIG. 2 shows a shift pattern for the multi-speed gearbox of the invention according to FIG. 1. In each gear, three shifting elements are engaged and two shifting elements are disengaged. In addition to the gearshift logic, the shift pattern also shows examples of values of gear transmission ratios "i" for individual gear ratios and the progressive ratios φ determined on that basis. The specified transmission ratios "i" are obtained from the (typical) standard gear ratios of the four planetary sets RS1, RS2, RS3, RS4 from minus 2.00, minus 1.55, minus 3.70, and minus 2.00. In addition, the shift pattern also shows that with a sequential shifting method, double or combination connections can be avoided, because in the gearshift logic, two adjacent gear ratios use two shifting elements in common. The sixth gear is configured as a direct gear.

The first forward gear is obtained by engaging the brakes A and B and the clutch C, the second forward gear by engaging the brakes A and B and the clutch E, the third forward gear by engaging the brake B and the clutches C and E, the fourth forward gear by engaging the brake B and the clutches D and E, the fifth forward gear by engaging the brake B and the clutches C and D, the sixth forward gear by engaging the clutches C, D and E, the seventh forward gear by engaging the brake A and the clutches C and D, and the eighth forward gear by engaging the brake A and the clutches D and E. As the shift pattern shows, the reverse gear is obtained by engaging the brakes A and B and the clutch D.

In terms of the invention, it is possible to start the motor vehicle with a shifting element that is integrated into the gearbox. A shifting element is particularly suitable if it is required in both the first forward gear and the reverse gear, in this case, therefore, preferably the brake A or the brake B. Advantageously, both of these brakes A, B are also required in the second forward gear. If the brake B is used as a starting element that is integrated into the gearbox, starting is even possible in the first five forward gears and the reverse gear. As the shifting pattern shows, the clutch C can also be used for the forward direction of motion when starting, and for starting in a reverse direction the clutch D can be used as the internal gearbox start element.

The following also apply to the example of implementation of a multi-speed gearbox according to the invention that are shown or described above.

In terms of the invention, different gear transitions can also be produced with the same shifting pattern, depending on the manual transmission ratio of the individual planetary gears, so that it is possible to have variations specific to vehicle use or type.

It is also possible to provide additional free-wheel clutches at any suitable position in the multi-speed gearbox, for example, between a shaft and the housing or, if necessary, in order to connect two shafts.

An axial differential and/or distributor differential can be arranged on the drive side or on the output side.

In an advantageous further development of the invention, the input shaft AN can be separated, if needed, by way of a coupling element from a drive motor, whereby a hydrodynamic converter, a hydraulic clutch, a dry starting clutch, a wet starting clutch, a magnetic powder clutch, or a centrifugal clutch could be employed as such a coupling element. It is also possible to arrange a driving element of this kind behind the gearbox in the direction of power flow, whereby in this case, the input shaft AN is permanently connected to the crankshaft of the drive motor.

In addition, the inventive multi-speed gearbox enables the arrangement of a torsion-vibration damper between the drive motor and the gearbox.

In a further version of the invention, a wear-free brake, such as a hydraulic or electric retarder or similar device, could be arranged on any shaft, preferably on the input shaft AN or the output shaft AB, this being particularly important for use in commercial vehicles. In addition, an auxiliary drive can also be provided to drive additional units on any shaft, preferably on the input shaft AN or the output shaft AB.

The shifting elements used can be configured as power-shifting clutches or brakes. Rim-pull clutches or brakes such as disk clutches, peripheral band brakes, and/or cone clutches, can be used particularly. In addition, form-locking brakes and/or clutches, such as synchronization and claw clutches, can also be used as shifting elements.

An additional advantage of the multi-speed gearbox presented here is the possibility of affixing an electrical machine as a generator and/or additional main engine on each shaft.

Any construction designs that do not affect the functioning of the gearbox as specified in these claims, in particular any spatial arrangement of the planetary sets or shifting elements as such or in relation to each other, and as far as technically expedient, fall under the scope of protection of the present claims, even if these designs are not explicitly presented in the figures or the description.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
Pl4 planetary gears of the fourth planetary gearset
i ratio
φ progressive ratio

The invention claimed is:

1. A multi-speed automatic gearbox of a planetary design for a motor vehicle, the gearbox comprising:
an input shaft (AN),
an output shaft (AB),
first, second, third and fourth planetary gearsets (RS1, RS2, RS3, RS4), at least first, second, third, fourth, fifth, sixth, seventh and eighth rotatable shafts (1, 2, 3, 4, 5, 6, 7, 8), and first, second, third, fourth and fifth shifting elements (A, B, C, D, E), whose selective engagement determines a variety different gear ratios between the input shaft (AN) and the output shaft (AB) such that eight forward gears and at least one reverse gear can be implemented;
a carrier (ST3) of the third planetary gearset (RS3) and the output shaft (AB) are coupled one another and comprise the second shaft (2);
a sun gear (SO1) of the first planetary gearset (RS1) and a sun gear (SO4) of the fourth planetary gearset (RS4) are coupled one another and comprise the third shaft (3);
a ring gear (HO1) of the first planetary gearset (RS1) is integral with the fourth shaft (4);
a carrier (ST1) of the first planetary gearset (RS1) and a ring gear (HO3) of the third planetary set (RS3) are coupled one another and comprise the sixth shaft (6);
a sun gear (SO2) of the second planetary gearset (RS2) and a ring gear (HO4) of the fourth planetary gearset (RS4) are coupled one another and comprise the seventh shaft (7);
a carrier (ST2) of the second planetary gearset (RS2) is integral with the eighth shaft (8);
a ring gear (HO2) of the second planetary gearset (RS2) and the input shaft (AN) are coupled one another and comprise the first shaft (1);
a sun gear (SO3) of the third planetary gearset (RS3) and a carrier (ST4) of the fourth planetary gearset (RS4) are coupled one another and comprise the fifth shaft (5);
the first shifting element (A) being between the third shaft (3) and a gearbox housing (GG);
the second shifting element (B) being located between the fourth shaft (4) and the gearbox housing (GG);
the third shifting element (C) being located, in a direction of power flow, between the first shaft (1) and the fifth shaft (5);
the fourth shifting element (D) being located, in the direction of power flow, between the eighth shaft (8) and the second shaft (2); and
the fifth shifting element (E) being located, in the direction of power flow, between the fifth shaft (5) and the eighth shaft (8).

2. The multi-speed gearbox according to claim 1, wherein a first forward gear is implemented by engaging the first, the second, and the third shifting elements (A, B, C);
a second forward gear is implemented by engaging the first, the second, and the fifth shifting elements (A, B, E);
a third forward gear is implemented by engaging the second, the third, and the fifth shifting elements (B, C, E);
a fourth forward gear is implemented by engaging the second, the fourth, and the fifth shifting elements (B, D, E);
a fifth forward gear is implemented by engaging the second, the third, and the fourth shifting elements (B, C, D);
a sixth forward gear is implemented by engaging the third, the fourth, and the fifth shifting elements (C, D, E);
a seventh forward gear is implemented by engaging the first, the third, and the fourth shifting elements (A, C, D);
an eighth forward gear is implemented by engaging the first, the fourth, and the fifth shifting elements (A, D, E); and;
a reverse gear is implemented by engaging the first, the second, and the fourth shifting elements (A, B, D).

3. The multi-speed gearbox according to claim 1, wherein the first, the second, the third and the fourth planetary gearsets (RS1, RS2, RS3, RS4) are negative planetary gearsets.

4. The multi-speed gearbox according to claim 1, wherein the first, the second, the third and the fourth planetary gearsets (RS1, RS2, RS3, RS4) are co-axial and are sequentially arranged in an axial direction as the first planetary gearset (RS1), then the fourth planetary gearset (RS4), then the second planetary gearset (RS2) and then the third planetary gearset (RS3).

5. The multi-speed gearbox according to claim 1, wherein the first shaft (1) is one of axially parallel to and at an angle with the second shaft (2), and one of the first and the third planetary gearset (RS1, RS3) is arranged on a side of the gearbox housing (GG) facing a drive engine of the gearbox that has a functional connection to the drive shaft (AN).

6. The multi-speed gearbox according to claim 1, wherein the first and the second shafts (1, 2) are co-axial, and the first planetary gearset (RS1) is arranged on a side of the gearbox housing (GG) closest a drive motor providing drive to the gearbox and communicates with the input shaft (AN).

7. The multi-speed gearbox according to claim 1, wherein only one of the first, the second, the third, the fourth, the fifth, the sixth, the seventh and the eighth shafts (1, 2, 3, 4, 5, 6, 7, 8) extends, in an axial direction, centrally through each of the first, the second, the third and the fourth planetary gearsets (RS1, RS2, RS3, RS4).

8. The multi-speed gearbox according to claim 1, wherein only the first shaft (1) extends, in an axial direction, centrally through the first and the fourth planetary gearsets (RS1, RS4), only the eighth shaft (8) extends, in the axial direction, centrally through the second planetary gearset (RS2), and only one of the eighth shaft (8) and the second shaft (2) extends, in the axial direction, centrally through the third planetary gearset (RS3).

9. The multi-speed gearbox according to claim 1, wherein none of the first, the second, the third, the fourth, the fifth, the sixth, the seventh and the eighth shafts (1, 2, 3, 4, 5, 6, 7, 8) extends, in an axial direction, centrally through one or more of the first and the fourth planetary gearset (RS1, RS4), both the eighth shaft (8) and the second shaft (2) extend, in the axial direction, centrally through both the second and third planetary gearsets (RS2, RS3), and one section of the second shaft (2) extends co-axially with a section of the eighth shaft (8).

10. The multi-speed gearbox according to claim 1, wherein only the first shaft (1) extends, in an axial direction, centrally through the first and the fourth planetary gearset (RS1, RS4), the fifth shaft (5) and the second shaft (2) extend, in the axial direction, centrally through the second planetary gearset (RS2), one section of the second shaft (2) extends centrally inside a section of the fifth shaft (5), and only the second shaft (2) extends, in the axial direction, centrally through the third planetary gearset (RS3).

11. The multi-speed gearbox according to claim 1, wherein the third shaft (3) is adjustably located on a hub fixed to the gearbox housing (GG).

12. The multi-speed gearbox according to claim 1, wherein at least one of the first and the second shifting elements (A, B) is located at least partially in an area radially about one of the first and the fourth planetary gearsets (RS1, RS4).

13. The multi-speed gearbox according to claim 1, wherein the first shifting element (A) is located axially parallel to the second shifting element (B) and at least one friction element of the second shifting element (B) is located axially closer to the fourth planetary gearset (RS4) than a friction element of the first shifting element (A).

14. The multi-speed gearbox according to claim 1, wherein one of the first shifting element (A) and the second shifting element (B) is at least radially located partially about the other of the respective first shifting element (A) and the second shifting element (B).

15. The multi-speed gearbox according to claim 1, wherein the third shifting element (C) is directly axially located on the fourth planetary gearset (RS4) and at least partially in an area axially between the fourth and the second planetary gearsets (RS4, RS2).

16. The multi-speed gearbox according to claim 1, wherein the fourth shifting element (D) is located at least partially on a side of the third planetary gearset (RS3) remote from the second planetary gearset (RS2), and the fourth shifting element (D) is located on the side of the third planetary gearset (RS3) remote from the second planetary gearset (RS2).

17. The multi-speed gearbox according to claim 1, wherein the fourth shifting element (D) is located adjacent to the fifth shifting element (E) and at least partially in an area axially between the second and the third planetary gearsets (RS2, RS3).

18. The multi-speed gearbox according to claim 1, wherein the fifth shifting element (E) is substantially located in an area axially between the second and the third planetary gearsets (RS2, RS3).

19. The multi-speed gearbox according to claim 1, wherein the fifth shifting element (E) is substantially located in an area axially between the second and the fourth planetary gearset (RS2, RS4).

20. The multi-speed gearbox according to claim 1, wherein at least one additional free-wheel clutch is located between at least one of the first, the second, the third, the fourth, the fifth, the sixth, the seventh and the eighth rotatable shafts (1, 2, 3, 4, 5, 6, 7, 8) and the gearbox housing (GG).

21. The multi-speed gearbox according to claim 1, wherein the input and the output shafts (AN, AB) are located on opposing sides of the gearbox housing (GG).

22. The multi-speed gearbox according to claim 1, wherein the input and the output shafts (AN, AB) are located on a common side of the gearbox housing (GG).

23. The multi-speed gearbox according to claim 1, wherein at least one of an axial differential and a distributor differential is arranged on one of the input and the output shafts (AN, AB).

24. The multi-speed gearbox according to claim 1, wherein one of a wear free brake and an auxiliary drive, for actuating an additional unit, is located on at least one of the first, the second, the third, the fourth, the fifth, the sixth, the seventh and the eighth shafts (1, 2, 3, 4, 5, 6, 7, 8) of the gearbox.

25. The multi-speed gearbox according to claim 1, wherein each of the first, the second, the third, the fourth and the firth shifting elements (A, B, C, D, E) are one of a disk clutch, a peripheral band brake, a cone clutch, a cone clutches and a claw clutches.

26. The multi-speed gearbox according to claim 1, wherein the fourth and the fifth shifting element (D, E) are substantially located in an area axially between the fourth and the second planetary gearsets (RS4, RS2).

27. The multi-speed gearbox according to claim 26, wherein the fourth and the fifth shifting elements (D, E) are axially adjacent the second planetary gearset (RS2), one friction element of the fourth shifting element (D) is located on a larger diameter than a friction element of the fifth shifting element (E).

28. The multi-speed gearbox according claim 26, wherein the fifth shifting element (E) is axially adjacent the second planetary gearset (RS2), and the fourth shifting element (D) is at least partially located on a side of the fifth shifting element (E) remote from the second planetary gearset (RS2).

29. The multi-speed gearbox according claim 28, wherein the fourth and the fifth shifting elements (D, E) have a common disk carrier which is coupled to the carrier (ST2) of the second planetary gearset (RS2).

30. The multi-speed gearbox according to claim 1, wherein an external coupling element is located in a direction of power flow between a drive motor and the input shaft (AN).

31. The multi-speed gearbox according to claim 30, wherein the external coupling element is one of a hydrodynamic converter, a hydraulic clutch, a dry start clutch, a wet start clutch, a magnetic powder clutch, and a centrifugal clutch.

32. The multi-speed gearbox according to claim 1, wherein starting of the motor vehicle is implemented with one of the first, the second, the third and the fourth shifting element (A, B, C, D), and the input shaft (AN) is rotationally fixed with a crankshaft of the drive motor.

33. The multi-speed gearbox according claim 32, wherein starting of the vehicle in one of a forward direction and a reverse direction is implemented with a common one of the first and the second shifting element (A, B).

* * * * *